(12) United States Patent
Kuriyama et al.

(10) Patent No.: US 8,441,650 B2
(45) Date of Patent: May 14, 2013

(54) GRAZING INCIDENCE INTERFEROMETER

(75) Inventors: Yutaka Kuriyama, Tsukuba (JP); Reiya Ootao, Tsukuba (JP)

(73) Assignee: Mitutoyo Corporation, Kawasaki (JP)

( * ) Notice: Subject to any disclaimer, the term of this patent is extended or adjusted under 35 U.S.C. 154(b) by 406 days.

(21) Appl. No.: 12/850,189

(22) Filed: Aug. 4, 2010

(65) Prior Publication Data

US 2011/0032536 A1    Feb. 10, 2011

(30) Foreign Application Priority Data

Aug. 5, 2009 (JP) ................. 2009-182265

(51) Int. Cl.
*G01B 11/02* (2006.01)

(52) U.S. Cl.
USPC .......................................... 356/512

(58) Field of Classification Search ............. 356/511, 356/512, 514, 520
See application file for complete search history.

(56) References Cited

U.S. PATENT DOCUMENTS

| 4,480,916 | A | 11/1984 | Bareket et al. |
| 6,249,351 | B1 | 6/2001 | de Groot |
| 2001/0017697 | A1 | 8/2001 | Kanda et al. |
| 2004/0027579 | A1 | 2/2004 | Lee et al. |
| 2008/0151258 | A1 | 6/2008 | Matsumoto et al. |

FOREIGN PATENT DOCUMENTS

JP       2008-032690       2/2008

OTHER PUBLICATIONS

Peter De Groot, "Diffractive Grazing-Incidence Interferometer", Applied Optics, Optical Society of America, U.S., vol. 39, No. 10, Apr. 1, 2000, pp. 1527-1530, XP000937003, ISSN: 0003-6935, DOI: 10.1364/AO.39.001527, Chapter 2., Figures 1, 2.

*Primary Examiner* — Tarifur Chowdhury
*Assistant Examiner* — Jonathan Hansen
(74) *Attorney, Agent, or Firm* — Rankin, Hill & Clark LLP

(57) ABSTRACT

A grazing incidence interferometer includes: a beam splitting section configured to split a beam from a beam source section into a measuring beam emergent to a measurement surface and a reference beam serving as a measurement reference, and configured to cause the measuring beam to emerge obliquely to the measurement surface; a beam combining part configured to combine the reference beam and the measuring beam reflected at the measurement surface, to obtain a combined beam; a detecting section configured to detect a profile of the measurement surface based on an interference fringe formed by the combined beam; and an image inverting part configured to invert an orientation of a wave front of the measuring beam or the reference beam, the image inverting part being provided in an optical path of the measuring beam or the reference beam leading from the beam splitting section to the beam combining section.

13 Claims, 8 Drawing Sheets

GRAZING INCIDENCE INTERFEROMETER

CROSS-REFERENCE TO RELATED APPLICATION(S)

This application is based upon and claims the benefit of priority from Japanese Patent Application No. 2009-182265, filed on Aug. 5, 2009, the entire contents of which are incorporated herein by reference.

BACKGROUND

1. Field of the Invention

The present invention relates to a grazing incidence interferometer.

2. Description of the Related Art

Conventionally, a grazing incidence interferometer is known as an interferometer which is capable measuring a measurement surface having large swell. As the grazing incidence interferometer, a common path type is known in which a measuring beam and a reference beam travel along identical optical paths, as disclosed in JP-A-2008-32690.

FIG. 6 is a diagram illustrating the configuration of a grazing incidence interferometer 1D of the common path type disclosed in JP-A-2008-32690. The grazing incidence interferometer 1D is comprised of a beam source section 100D, a prism 200D as a beam splitting part and a beam combining part, and a detecting section 400D. The beam source section 100D includes a laser beam source 101 and lenses 102 and 103. The prism 200D has the functions of the beam splitting part for splitting an incident beam into a measuring beam to be made incident on a measurement surface S and a reference beam serving as a measurement reference and of the beam combining part for combining the reference beam and the measuring beam to obtain a combined beam (interference beam). The detecting section 400D includes a lens 401, an imaging means 402 having a CCD (charge-coupled device), and an unillustrated computing means having a CPU (central processing unit).

The beam emitted from the laser beam source 101 is converted to a collimated beam by the lenses 102 and 103, and is then made incident on the prism 200D. Part of this beam is reflected by a bottom surface 200D1 of the prism 200D to serve as a reference beam, and the remaining part is made emergent to outside the prism 200D and is incident on the measurement surface S to serve as a measuring beam. The measuring beam incident on the measurement surface S is reflected by that measurement surface S, is then incident on the prism 200D, and is combined with the reference beam to form a combined beam. The combined beam forms interference fringes on the imaging means 402 through the lens 401. The interference fringes are imaged by the imaging means 402. The unillustrated computing means performs arithmetic processing on the basis of an interference fringe image picked up by the imaging means 402 to thereby obtain the profile of the measurement surface S.

Next, referring to FIG. 6, a description will be given of the effect exerted on the measurement accuracy by the wave front error of the beam emitted from the laser beam source 101. Besides, the wave front error is caused by various factors, for example, influences of the configurations disposed on the optical path. In FIG. 6, in a case where a proximal end side in the traveling direction of the beam is viewed from a distal end side, the wave front of each beam is represented by an image of R. The orientation of the wave front is inverted each time the beam undergoes one reflection. In the grazing incidence interferometer 1D, the reference beam has undergone one reflection at the bottom surface 200D1 of the prism 200D, and the measuring beam has undergone one reflection at the measurement surface S, so that orientations of the wave fronts of the reference beam and the measuring beam, i.e., combined beam components, are inverted with respect to the orientation of the wave front of the beam emitted from the laser beam source 101, and their orientations become identical. Accordingly, in the interference fringes which are formed from the difference between the wave front of the reference beam and the wave front of the measuring beam, even if a distortion is present in the wave front of the beam emitted from the laser beam source 101, that distortion becomes cancel. For this reason, in the grazing incidence interferometer 1D, the wave front error of the beam emitted from the laser beam source 101 does not affect the measurement accuracy.

As the grazing incidence interferometer, in addition to the above-described common path type, a non-common path type is known in which the reference beam and the measuring beam travel along different optical paths, as shown in JP-A-2008-32690. FIG. 7 is a diagram illustrating the configuration of a grazing incidence interferometer 1E of the non-common path type described in JP-A-2008-32690. Hereafter, those functional parts that are identical to those of the grazing incidence interferometer 1D shown in FIG. 6 will be denoted by the same reference numerals, and a description thereof will be omitted or simplified. In addition, in FIG. 7, the double-sided arrow sign indicates a linearly-polarized beam component parallel to the plane of the drawing, while a double-circle sign indicates a linearly-polarized beam component perpendicular to the plane of the drawing.

The grazing incidence interferometer 1E is comprised of a beam source section 100E, a beam splitting section 200E, a beam splitter 300E as a beam combining part, and a detecting section 400E. The beam source section 100E is configured in the same way as the aforementioned beam source section 100D. The beam splitting section 200E includes a beam splitter 201 and a half-wave plate 202. The detecting section 400E includes a quarter-wave plate 403, a lens 404, a three-split prism 405, polarizing plates 406A to 406C, imaging means 407A to 407C, and a computing means 408. The detecting section 400E is adapted to be able to obtain three interference fringe images each of which has a phase differ from each other, and is so adapted as to be able to attain reduction in analysis time and improvement of vibration resistance.

The beam emitted from the laser beam source 101 is made incident on the beam splitter through the lenses 102 and 103, and is thereby split into a reference beam and a measuring beam. The reference beam is transmitted through the half-wave plate 202, and is then incident on the beam splitter 300E. The measuring beam is incident on the measurement surface S, is reflected at the measurement surface S, and is then incident on the beam splitter 300E. The reference beam and the measuring beam incident on the beam splitter 300E are combined into a combined beam, and is made emergent from the beam splitter 300E. The combined beam emergent from the beam splitter 300E is split into 3 phase-shifted beams by the quarter-wave plate 403, the lens 404, the three-split prism 405, and the polarizing plates 406A to 406C, and the respective beams form interference fringes on the respective imaging means 407A to 407C. The respective interference fringes are imaged by the respective imaging means 407A to 407C. The computing means 408 performs arithmetic processing on the basis of the three interference fringe images picked up by the imaging means 407A to 407C to thereby obtain the profile of the measurement surface S.

In this grazing incidence interferometer 1E, since the reference beam does not undergo reflection, the orientation of the wave front becomes identical to the orientation of the wave front of the beam emitted from the laser beam source 101. Meanwhile, as for the measuring beam, since it has undergone one reflection at the measurement surface S, the orientation of the wave front is inverted with respect to the orientation of the wave front of the beam emitted from the laser beam source 101. Accordingly, since the orientations of the wave fronts of the reference beam and the measuring beam of the combined beam components are mutually inverted, the wave front error of the beam emitted from the laser beam source 101 is not canceled in the interference fringes formed on the imaging means 407A to 407C from the combined beam. For this reason, in this grazing incidence interferometer 1E, the wave front error of the beam emitted from the laser beam source 101 affects the measurement accuracy.

Accordingly, a grazing incidence interferometer of the non-common path type has been developed in which the orientations of the wave fronts of the reference beam and the measuring beam of the combined beam components can be arranged properly (e.g., see FIG. 1 in U.S. Pat. No. 6,249,351). FIG. 8 is a diagram illustrating the configuration of a grazing incidence interferometer 1F of the non-common path type described in U.S. Pat. No. 6,249,351. The grazing incidence interferometer 1F is comprised of a beam source section 100F, a beam splitting section 200F, a diffraction grating 300F as a beam combining part, and a detecting section 400F. The beam source section 100F includes the laser beam source 101 and the lens 104. The beam splitting section 200F includes a diffraction grating 203 and a reference mirror 204. The detecting section 400F includes lenses 409 and 410 and a viewing screen 411.

The beam emitted from the laser beam source 101 is incident on the diffraction grating 203, and is thereby split into a measuring beam and a reference beam. The measuring beam is reflected at the measurement surface S, and is then incident on the diffraction grating 300F. The reference beam is reflected at the measurement surface S, and is incident on the diffraction grating 300F. The reference beam is reflected at the reference mirror 204, and is incident on the diffraction grating F. The measuring beam and the reference beam incident on the diffraction grating 300F are combined into a combined beam, which is emergent from the diffraction grating 300F and then forms interference fringes on the viewing screen 411 through the lenses 409 and 410. Accordingly, these interference fringes are imaged by the imaging means, and are subjected to arithmetic processing by the computing means on the basis of the interference fringe image picked up by the imaging means, thus making it possible to obtain the profile of the measurement surface S.

In this grazing incidence interferometer 1F, since the measuring beam and the reference beam both undergo one reflection, the orientations of the wave fronts can be inverted with respect to the orientation of the wave front of the beam emitted from the laser beam source 101, so that the orientations of the wave fronts of the measuring beam and the reference beam of the combined beam components can be arranged properly. For this reason, the wave front error of the beam emitted from the laser beam source 101 is canceled in the interference fringes formed on the viewing screen 411, thus making it possible to prevent the distortion of that wave front from affecting the measurement accuracy.

Each of the above-described grazing incidence interferometers 1D to 1F has a drawback. The grazing incidence interferometer 1D is capable of properly arranging the orientations of the wave fronts of the measuring beam and the reference beam of the combined beam components, and is able to prevent the wave front error of the beam emitted from the laser beam source 101 from affecting the measurement accuracy.

However, since the grazing incidence interferometer 1D has a geometrical-optical restriction in that the measurement accuracy declines appreciably unless the bottom surface 200D1 of the prism 200D is brought into very close proximity to the measurement surface S until the bottom surface 200D1 substantially contacts the measurement surface S, it is necessary to precisely conduct management of distance between the bottom surface 200D1 of the prism 200D and the measurement surface S, so that there is a problem in that the ease of use is poor. Further, the prism 200D or the measurement surface S is in danger of breakage due to the collision or the contact.

With the grazing incidence interferometer 1E, it is unnecessary to precisely conduct management of distance between, on the one hand, the beam splitting section 200E and the beam splitter 300E and, on the other hand, the measurement surface S, so that the ease of use is excellent. However, since the orientations of the wave fronts of the measuring beam and the reference beam of the combined beam components are unfavorably inversed, there is a problem in that the wave front error of the beam emitted from the laser beam source 101 disadvantageously affects the measurement accuracy.

The grazing incidence interferometer 1F is capable of properly arranging the orientations of the wave fronts of the measuring beam and the reference beam of the combined beam components, and is able to prevent the wave front error of the beam emitted from the laser beam source 101 from affecting the measurement accuracy. In addition, it is unnecessary to precisely conduct management of distance between, on the one hand, the beam splitting section 200F and the diffraction grating 300F and, on the other hand, the measurement surface S, so that the ease of use is excellent. However, with the grazing incidence interferometer 1F, there is a problem in that the configuration becomes disadvantageously special since the reference mirror 204 and the diffraction grating 203 are used.

SUMMARY

An object of the present invention is to provide a grazing incidence interferometer which, without adopting a special configuration, makes it possible to prevent the wave front error of the beam emitted from the beam source section from affecting the measurement accuracy, and is capable of rendering the ease of use excellent.

According to an aspect of the invention, there is provided a grazing incidence interferometer including: a beam source section; a beam splitting section configured to split a beam from the beam source section into a measuring beam emergent to a measurement surface and a reference beam serving as a measurement reference, and configured to cause the measuring beam to emerge obliquely to the measurement surface; a beam combining part configured to combine the reference beam and the measuring beam reflected at the measurement surface, to obtain a combined beam; a detecting section configured to detect a profile of the measurement surface based on an interference fringe formed by the combined beam; and an image inverting part configured to invert an orientation of a wave front of the measuring beam or the reference beam, wherein: the beam splitting section causes the reference beam to emerge with an attitude in which the reference beam directly reaches the beam combining section; and the image inverting part is provided in an optical path of the measuring beam or the reference beam leading from the beam splitting section to the beam combining section.

According to the present invention, since the orientation of the wave front of the measuring beam or the reference beam is inverted by the image inverting part which is provided in the optical path of the measuring beam or the reference beam leading from the beam splitting section to the beam combining section, it is possible to properly arrange the orientations of the wave fronts of the measuring beam and the reference beam of the combined beam components are arranged properly. Therefore, in the interference fringe which is formed by the combined beam, it is possible to cancel the wave front error of the beam emitted from the beam source section, thus making it possible to prevent the wave front error from affecting the measurement accuracy. The reference beam and the measuring beam are emergent from the beam splitting section and, after respectively travelling along different optical paths, are combined by the beam combining section. Accordingly, since the grazing incidence interferometer in accordance with the present invention is configured as a non-common path type, it is unnecessary to precisely conduct management of distance between, on the one hand, the beam splitting section and the beam combining section and, on the other hand, the measurement surface, so that the ease of use can be made excellent. The beam splitting section causes the reference beam to emerge in an attitude in which the reference beam directly reaches the combining section. Accordingly, since the basic configuration is similar to that of a general conventional non-common path type grazing incidence interferometer (e.g., the grazing incidence interferometer 1E in FIG. 7), the grazing incidence interferometer in accordance with the present invention can be obtained by providing the image inverting part in the optical path of the measuring beam or the reference beam of the conventional grazing incidence interferometer, so that fabrication can be facilitated. As described above, in accordance with the present invention, it is possible to prevent the wave front error of the beam emitted from the beam source section from affecting the measurement accuracy and to render the ease of use excellent without adopting a special configuration.

The image inverting part may be provided in the optical path of the reference beam leading from the beam splitting section to the beam combining section. Here, the reference beam is made emergent from the beam splitting section with an attitude of directly reaching the beam combining section, while the measuring beam is made emergent obliquely from the beam splitting section toward the measurement surface, and after undergoing reflection at the measurement surface, reaches the beam combining section. Therefore, the optical path of the reference beam becomes shorter than the optical path of the measuring beam. If the difference in the optical path length between the reference beam and the measuring beam becomes greater than the coherent distance of the beam emitted from the beam source section, there is a possibility that the contrast of the interference fringe declines and the measurement accuracy disadvantageously deteriorates. In the present invention, however, since the image inverting part is provided in the optical path of the reference beam, the optical path length of the reference beam can be made large by the image inverting section, so that the difference in the optical path length between the reference beam and the measuring beam can be set to less than the coherent distance. For this reason, the contrast of the interference fringe can be made excellent, thus allowing the measurement accuracy to be maintained satisfactorily.

The image inverting part may include a dove prism formed with a cross-sectionally trapezoidal shape having equal base angles, and the dove prism may refract the beam incident on one end face thereof toward a bottom surface side thereof, and after reflecting the beam at the bottom surface toward another end face thereof, makes the beam from the other end face emergent along a direction identical to an incidence direction of the beam with respect to the one end face.

According to the present invention, the image inverting part is constituted by a dove prism for inverting the orientation of the wave front of the incident beam by once reflecting the incident beam at its bottom surface. As for the dove prism, since its incident direction and its emergent direction are identical, the dove prism can be easily provided in the optical path of the measuring beam or the reference beam of the conventional grazing incidence interferometer, so that the fabrication can be facilitated. Additionally, since the dove prism has a greater refractive index than the air, the optical path length of the incident beam can be made large. For this reason, the optical path length of the reference beam can be enlarged by the provision of the dove prism in the optical path of the reference beam, so that the difference in the optical path length between the reference beam and the measuring beam can be set to less than the coherent distance.

The image inverting part may include a plurality of reflection mirrors, reflects an incident beam three times by the plurality of reflection mirrors, and after inverting its wave front, makes the beam emergent along a direction identical to an incident direction. According to the present invention, as the incident beam is reflected an odd number of times by the plurality of reflection mirrors, the image inverting part inverts the orientation of the wave front of the incident beam and makes it emergent to outside the image inverting part. As for this image inverting part as well, since its incident direction and its emergent direction are identical, the image inverting part can be easily provided in the optical path of the measuring beam or the reference beam of the conventional grazing incidence interferometer, so that the fabrication can be facilitated. Additionally, since the image inverting part reflects within it the incident beam an odd number of times, the optical path length of the incident beam can be made large. For this reason, the optical path length of the reference beam can be enlarged by the provision of the image inverting part of the invention in the optical path of the reference beam, so that the difference in the optical path length between the reference beam and the measuring beam can be set to less than the coherent distance.

The beam splitting section may include a splitting member and a first bending member, the splitting member may split the beam emergent from the beam source section into the measuring beam and the reference beam and cause the reference beam to emerge with an attitude in which the reference beam directly reaches the team combining section, the first bending member may cause the measuring beam emergent from the splitting member and incident on the first bending member to emerge obliquely toward the measurement surface, to thereby bend the optical path of the measuring beam, the beam combining section may include a second bending member and a combining member, the second bending member may cause the measuring beam reflected at the measurement surface and incident on the second bending member to emerge toward the combining member, to thereby bend the optical path of the measuring beam toward a side of the combining member, and the combining member may combine the reference beam emergent from the splitting member and the measuring beam emergent from the second bending member to obtain a combined beam.

According to the present invention, the beam splitting section and the beam combining section are respectively provided with bending members constituted by, for instance, reflection mirrors for bending the optical path of the measuring beam, apart from the splitting member and the combining member. Accordingly, by adjusting the attitudes of the respective bending members of the beam splitting section and the beam combining section, it is possible to easily change the angle of incidence of the measuring beam with respect to the measurement surface.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
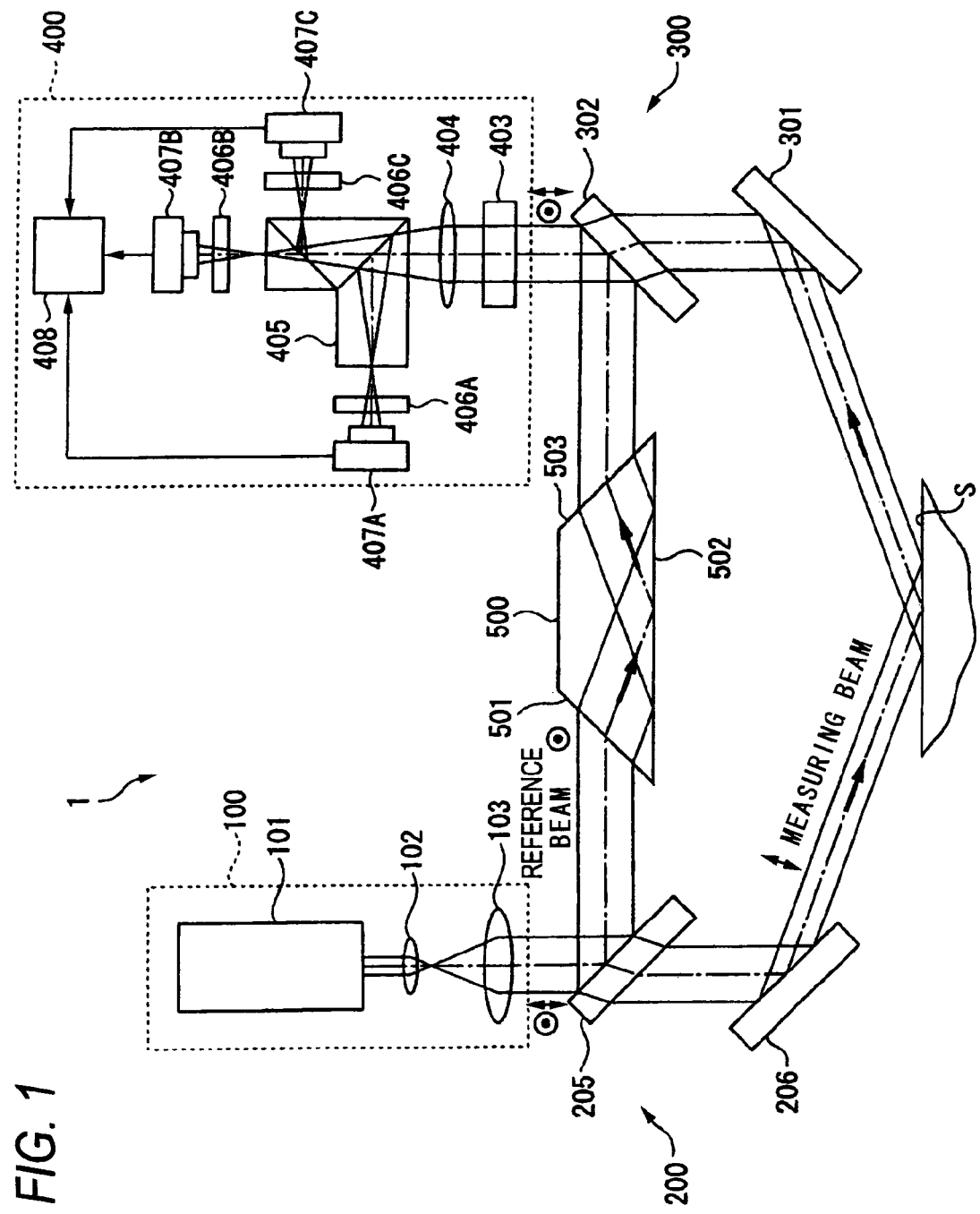
FIG. 1 is a diagram illustrating the configuration of a grazing incidence interferometer in accordance with a first embodiment of the present invention.

Referring now to the accompanying drawings, a description will be given of a first embodiment of the invention. FIG. 1 is a diagram illustrating the configuration of a grazing incidence interferometer 1 in accordance with a first embodiment of the present invention. The grazing incidence interferometer 1 is comprised of a beam source section 100, a beam splitting section 200, a beam combining section 300, a detecting section 400, and a dove prism 500 as an image inverting part. The beam source section 100 includes a laser beam source 101 and lenses 102 and 103. As the laser beam source 101, a simple stabilized laser beam source with a coherent distance of several 10 mm to several 100 mm is used.

The beam splitting section 200 splits the incident beam into a measuring beam made emergent to a measurement surface S and a reference beam serving as a measurement reference, and makes the reference beam emergent to the beam combining section 300 side and makes the measurement beam obliquely emergent to the measurement surface S. The beam splitting section 200 has a polarizing beam splitter 205 as a splitting member as well as a reflection mirror 206 as a first bending member.

Of the beam emitted from the laser beam source 101 and made incident through the lenses 102 and 103, the polarizing beam splitter 205 reflects s-polarized beam as the reference beam with an attitude of causing that beam to directly reach the beam combining section 300, and transmits p-polarized beam as the measuring beam. The reflection mirror 206 reflects the measuring beam transmitted through the polarizing beam splitter 205 toward the measurement surface S so as to bend the optical path of the measuring beam.

The beam combining section 300 combines the reference beam emergent from the beam splitting section 200 and the measuring beam reflected by the measurement surface S to obtain a combined beam, which is made emergent to the detecting section 400 side. The beam combining section 300 has a reflection mirror 301 as a second bending member and a polarizing beam splitter 302 as a combining member. The reference beam 301 reflects the measuring beam reflected at the measurement surface S toward the polarizing beam splitter 302 side so as to bend the optical path of the measuring beam. The polarizing beam splitter 302 reflects the reference beam emergent from the polarizing beam splitter 205 and transmits the measuring beam reflected at the reflection mirror 301 to thereby combine the reference beam and the measuring beam into a combined beam, and makes the combined beam emergent to the detecting section 400 side.

The detecting section 400 includes a quarter-wave plate 403, a lens 404, a three-split prism 405, polarizing plates 406A to 406C, imaging means 407A to 407C, and a computing means 408. The detecting section 400 detects the profile of the measurement surface S on the basis of interference fringes formed from the combined beam on the respective imaging means 407A to 407C.

The dove prism 500 is a prismatic bar-shaped optical member having a cross-sectionally trapezoidal shape having equal base angles, and is formed of an optical glass whose refractive index is greater than that of air. The dove prism 500 is provided on the optical path of the reference beam leading from the beam splitting section 200 to the beam combining section 300. The dove prism 500 refracts the reference beam incident on one end face 501 toward a bottom surface 502 side, and after reflecting the reference beam at the bottom surface 502 toward the other end face 503, makes the reference beam from the other end face 503 emergent to outside the dove prism 500 along a direction identical to the incidence direction of the reference beam with respect to the one end face 501.

Figure 2:
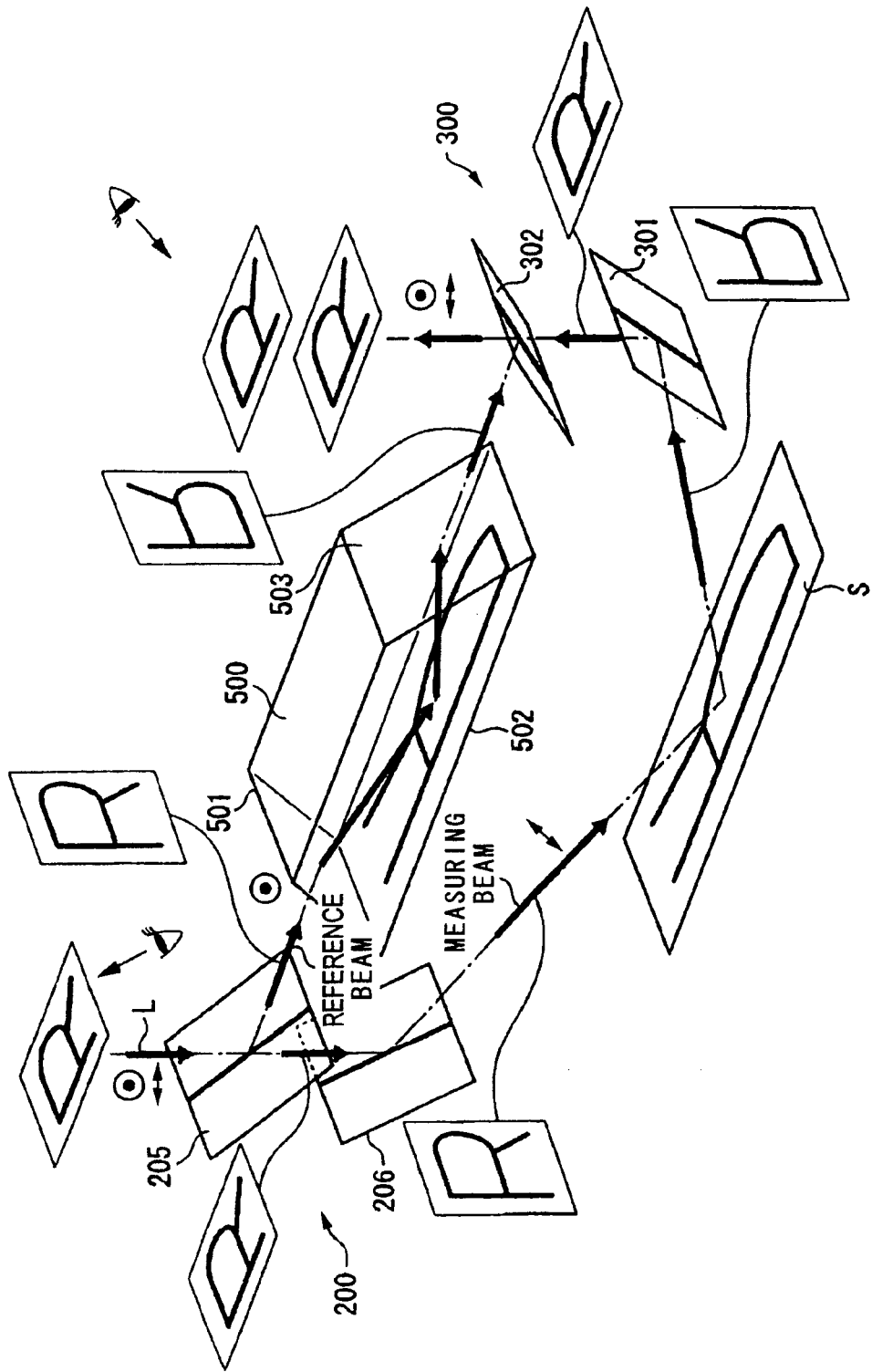
FIG. 2 is a perspective view illustrating orientations of wave fronts of a reference beam and a measuring beam.

FIG. 2 is a perspective view illustrating the orientations of the wave fronts of the reference beam and the measuring beam. The orientation of the wave front is inverted each time the beam undergoes reflection. Accordingly, in FIG. 2, if the orientation of the wave front of the beam L emitted from the laser beam source 101 is viewed (see an eye mark) from the distal end side in the traveling direction of beam L, and is represented by an image of inverse R, the orientation of the wave front is inverted and is represented by an image of R since the reference beam of the combined beam components undergoes three reflections by the polarizing beam splitter 205, the bottom surface 502 of the dove prism 500, and the polarizing beam splitter 302.

In addition, also as for the measuring beam of the combined beam components, the orientation of its wave front is inverted and is represented by the image of R since the measuring beam undergoes three reflections by the reflection mirror 206, the measurement surface S, and the reflection mirror 301. Accordingly, the orientations of the wave fronts of the measuring beam and the reference beam of the combined beam components are both represented by images of R, and the orientations of their wave fronts become identical. Therefore, in the interference fringes which are formed from the combined beam of the of the measuring beam and the reference beam whose orientations of the wave fronts are identical, the wave front error of the beam emitted from the laser beam source 101 is canceled. For this reason, with the grazing incidence interferometer 1, it is possible to prevent that distortion from affecting the measurement accuracy.

According to the above-described embodiment, it is possible to offer the following advantages. Since the orientation of the wave front of the reference beam is inverted by the dove prism 500, the orientations of the wave fronts of the measuring beam and the reference beam of the combined beam components can be arranged properly. Therefore, in the interference fringes which are formed by the combined beam, it is possible to cancel the wave front error of the beam emitted from the beam source section 100, thus making it possible to prevent the wave front error from affecting the measurement accuracy. Since the grazing incidence interferometer 1 is configured as a non-common path type in which the reference beam and the measuring beam travel along different optical paths, it is unnecessary to precisely conduct management of distance between, on the one hand, the beam splitting section 200 and the beam combining section 300 and, on the other hand, the measurement surface S, so that the ease of use can be made excellent.

The beam splitting section 200 causes the reference beam to emerge in an attitude in which the reference beam directly reaches the combining section. Accordingly, since the basic configuration is similar to that of a general conventional non-common path type grazing incidence interferometer, the grazing incidence interferometer 1 in accordance with this embodiment can be obtained by providing the dove prism 500 in the optical path of the reference beam of the conventional grazing incidence interferometer, so that fabrication can be facilitated. As described above, the grazing incidence interferometer 1 is able to prevent the wave front error of the beam emitted from the beam source section 100 from affecting the measurement accuracy and to render the ease of use excellent without adopting a special configuration.

Although a stabilized laser beam source with a coherent distance of several m or more can be used as the laser beam source 101, in this embodiment, a simple stabilized laser beam source with a coherent distance of several 10 mm to several 100 mm is adopted as the laser beam source 101 by taking into consideration the cost factor and the amount of noise generated. Besides, the noise means inessential interference occurred between the surfaces of the optical elements that are disposed on the optical path. Since the optical path of the reference beam becomes shorter than the optical path of the measuring beam owing to the distances between the members 205 and 206 and between the members 301 and 302 and by the portion by which the reference beam is not reflected at the measurement surface S, depending on the setting of the optical paths of the reference beam and the measuring beam, the difference between the optical path lengths of the both beams becomes greater than the coherent distance, so that there is a possibility that the contrast of the interference fringes declines and the measurement accuracy disadvantageously deteriorates. In this embodiment, however, as a result of the fact that the dove prism 500 having a greater refractive index than the air is provided in the optical path of the reference beam, the optical path length of the reference beam can be made large, so that the difference in the optical path length between the reference beam and the measuring beam can be reliably set to less than the coherent distance. For this reason, the contract of the interference fringes can be made excellent, thus allowing the measurement accuracy to be maintained satisfactorily.

Since the dove prism 500 in which the incident direction and the emergent direction are identical is used as the image inverting part, the dove prism 500 can be easily provided in the optical path of the reference beam of a conventional grazing incidence interferometer, so that the fabrication of the grazing incidence interferometer 1 can be facilitated. The beam splitting section 200 and the beam combining section 300 are respectively provided with the reflection mirrors 206 and 301 for bending the optical path of the measuring beam, in addition to the polarizing beam splitters 205 and 302 for respectively splitting and combining the beam. For this reason, by adjusting the attitudes of these reflection mirrors 206 and 301, it is possible to easily change the angle of incidence of the measuring beam with respect to the measurement surface S.

Figure 3:
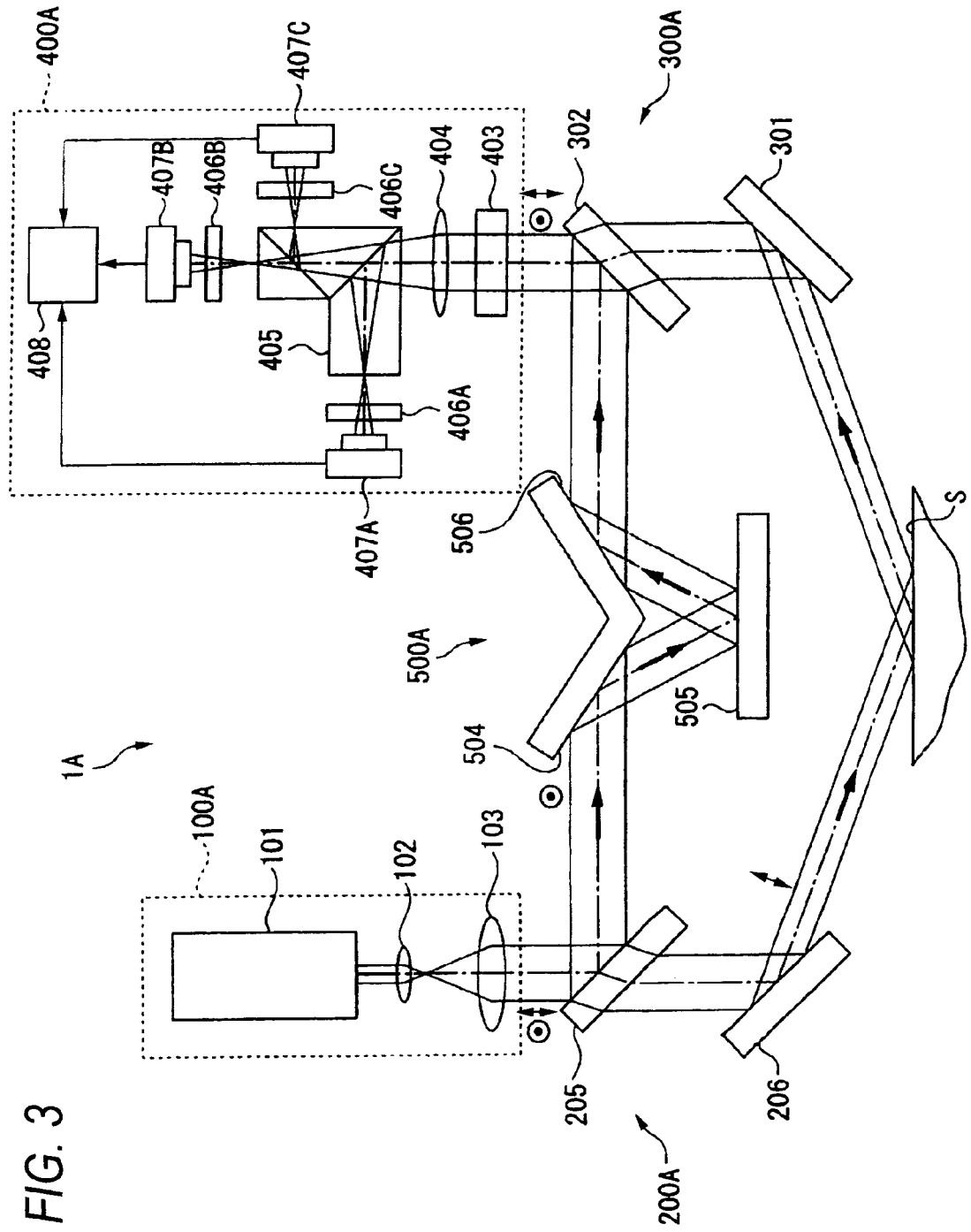
FIG. 3 is a diagram illustrating the configuration of a grazing incidence interferometer in accordance with a second embodiment of the present invention.

FIG. 3 is a diagram illustrating the configuration of a grazing incidence interferometer 1A in accordance with a second embodiment of the present invention. This embodiment is characterized in that the image inverting part is constituted by an image rotator mirror 500A. The image rotator mirror 500A has three reflection mirrors 504, 505, and 506, reflects the reference beam three times by these reflection mirrors 504, 505, and 506, and after inverting its wave front, makes the reference beam emergent along a direction identical to the incident direction.

Also with this embodiment described above, as the reference beam is reflected three times by the image rotator mirror 500A, the orientation of the wave front of the reference beam can be inverted, and the orientations of the wave fronts of the reference beam and the measuring beam of the combined beam components can thereby be arranged properly, thus allowing the measurement accuracy to be maintained satisfactorily. In addition, since its incident direction and its emergent direction are identical, the image rotator mirror 500A can be easily provided in the optical path of the reference beam of the conventional grazing incidence interferometer, so that the grazing incidence interferometer 1A can be fabricated easily. Additionally, as the reference beam is reflected three times, the image rotator mirror 500A can enlarge the optical path length of the reference beam, so that the difference in the optical path length between the reference beam and the measuring beam can be reliably set to less than the coherent distance.

Figure 4:
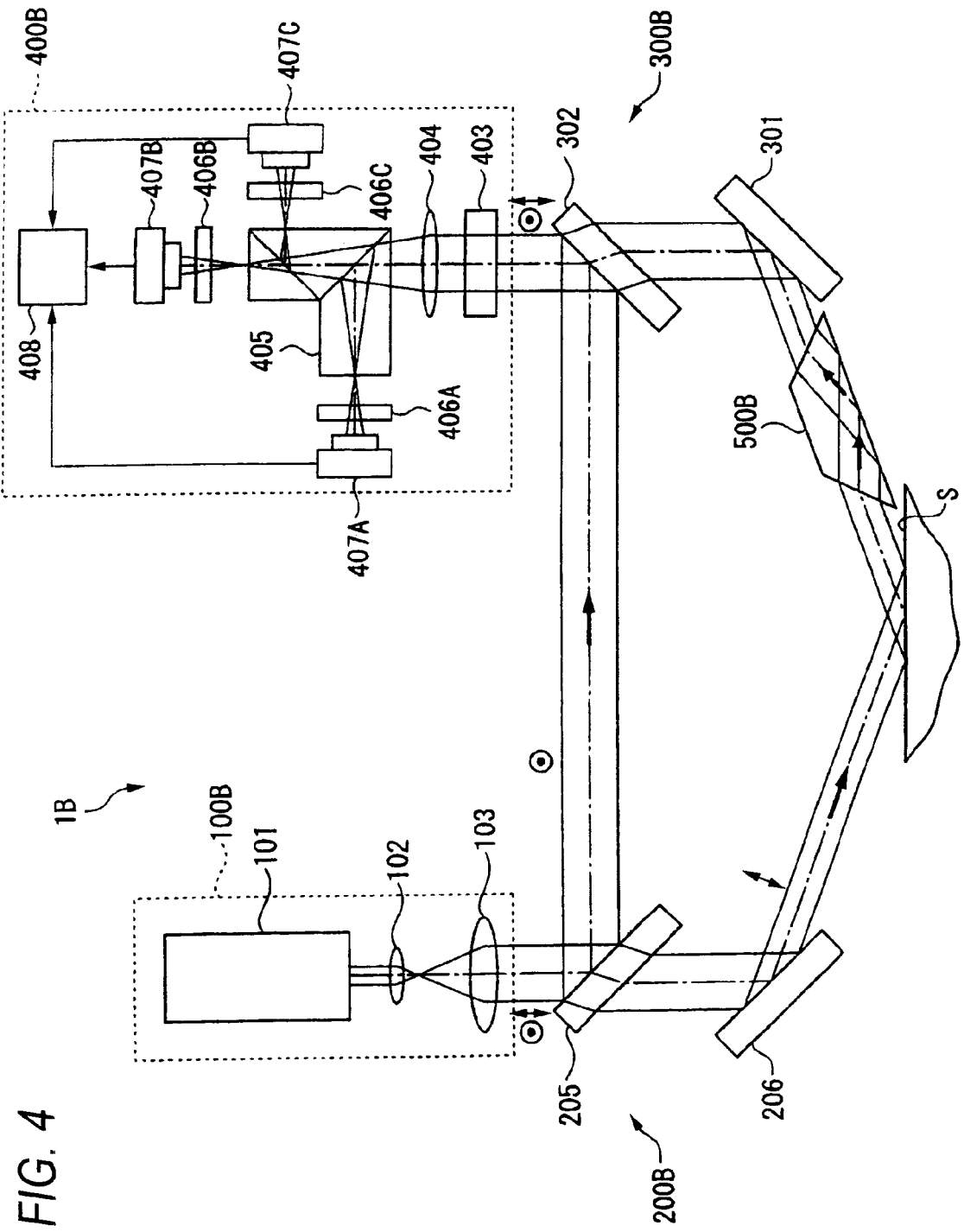
FIG. 4 is a diagram illustrating the configuration of a grazing incidence interferometer in accordance with a third embodiment of the present invention

It should be noted that although the configuration provided in this embodiment is such that the reference beam is reflected three times by the three reflection mirrors 504, 505, and 506, the number of reflection of the reference beam is not limited to three, and the number of reflection mirrors is not limited to three insofar as the reference beam can be reflected an odd number of times FIG. 4 is a diagram illustrating the configuration of a grazing incidence interferometer 1B in accordance with a third embodiment of the present invention. This embodiment is characterized in that a dove prism 500B as an image inverting part is provided in the optical path of the measuring beam. Also with this embodiment described above, since the dove prism 500B in which the incident direction and the emergent direction are identical is used as the image inverting part, the dove prism 500B can be easily provided in the optical path of the measuring beam of the conventional grazing incidence interferometer, so that the fabrication of the grazing incidence interferometer 1B can be facilitated. In addition, since the as wave front of the measuring beam is inverted by the dove prism 500B, the orientations of the wave fronts of the measuring beam and the reference beam of the combined beam components can be arranged properly, so that the measurement accuracy can be maintained satisfactorily.

Figure 7:
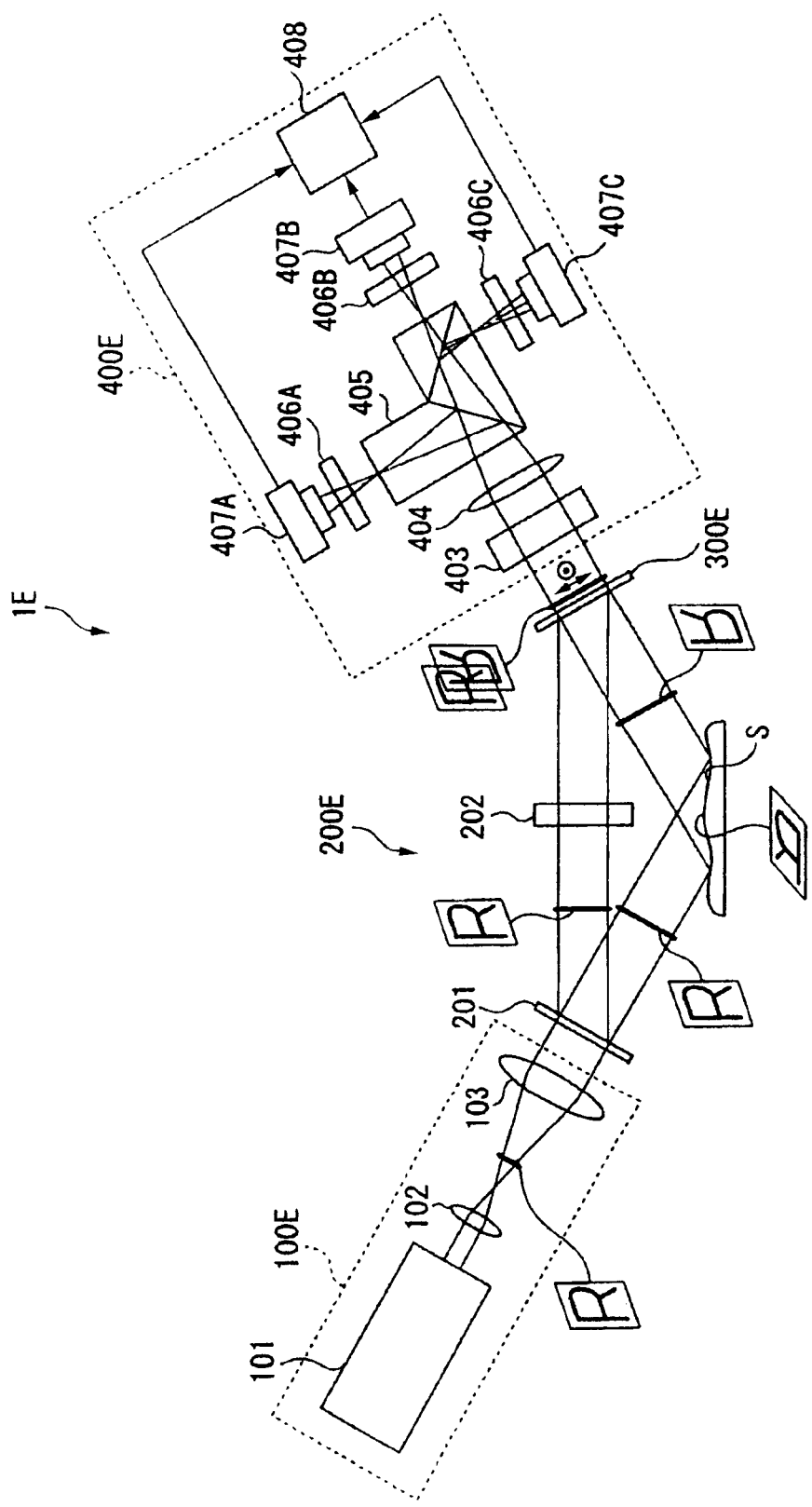
FIG. 7 is a diagram illustrating the configuration of a conventional grazing incidence interferometer of a non-common path type.
Figure 8:
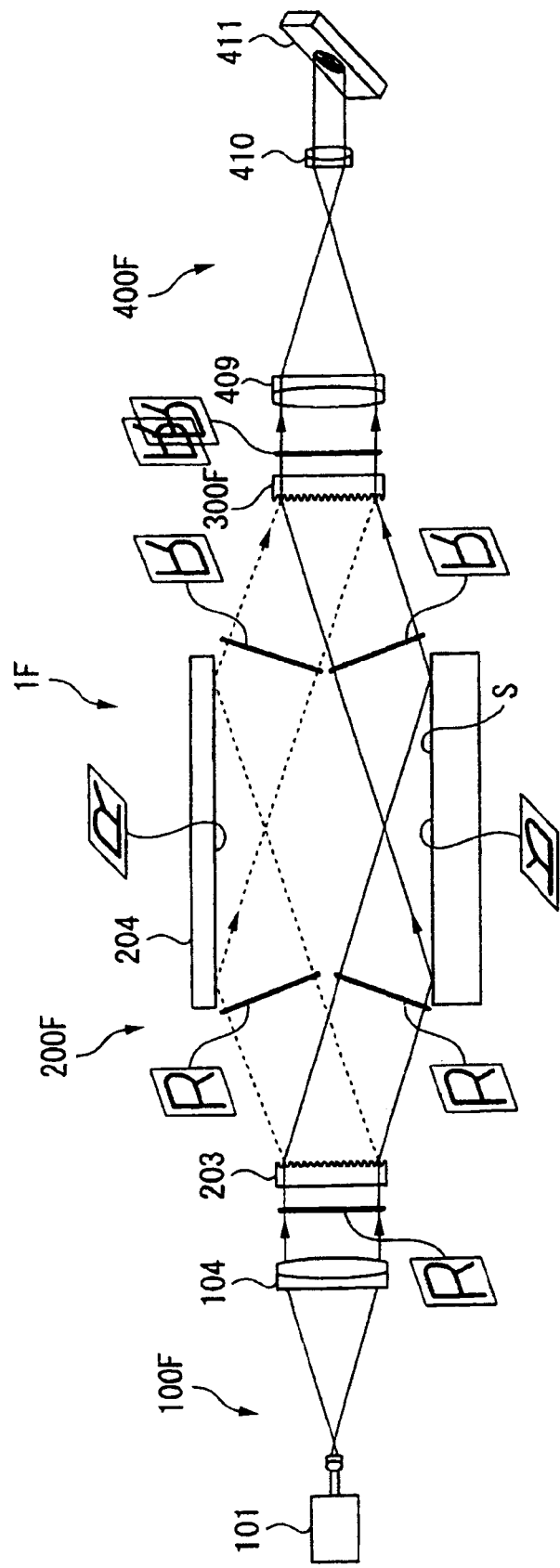
FIG. 8 is a diagram illustrating the configuration of another conventional grazing incidence interferometer of the non-common path type.

It should be noted that the present invention is not limited to the foregoing embodiments, and modifications, improvements, and the like within the scope in which the object of the present invention can be attained are included in the present invention. In the above-described embodiments, the beam splitting sections 200 to 200B and the beam combining sections 300 to 300B are respectively provided with the reflection mirrors 206 and 301 as bending members for bending the optical path of the measuring beam, in addition to the polarizing beam splitters 205 and 302. However, the beam splitting section and the beam combining section may be provided with only the beam splitter as in the conventional grazing incidence interferometer 1E shown in FIG. 7, and the bending members may not be provided. Although in the above-described embodiments the detecting sections 400 to 400B are able to obtain three kinds of interference fringes with the phase shifted, the detecting section may not be able to obtain a plurality of interference fringes with the phase shifted, and is sufficient if it is able to detect the profile of the measurement surface on the basis of the interference fringe.

Figure 5:
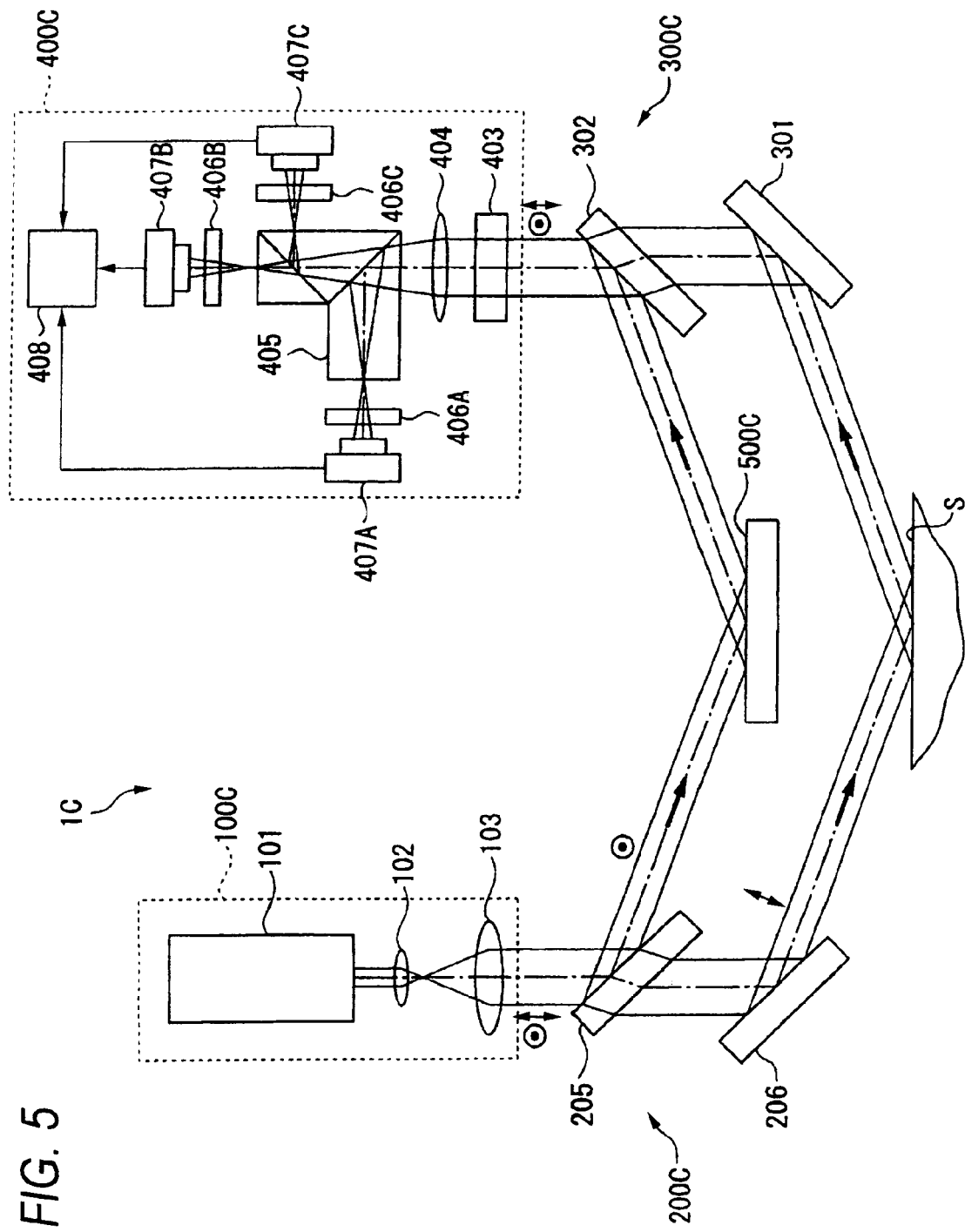
FIG. 5 is a diagram illustrating the configuration of a grazing incidence interferometer in accordance with a reference example of the present invention.
Figure 6:
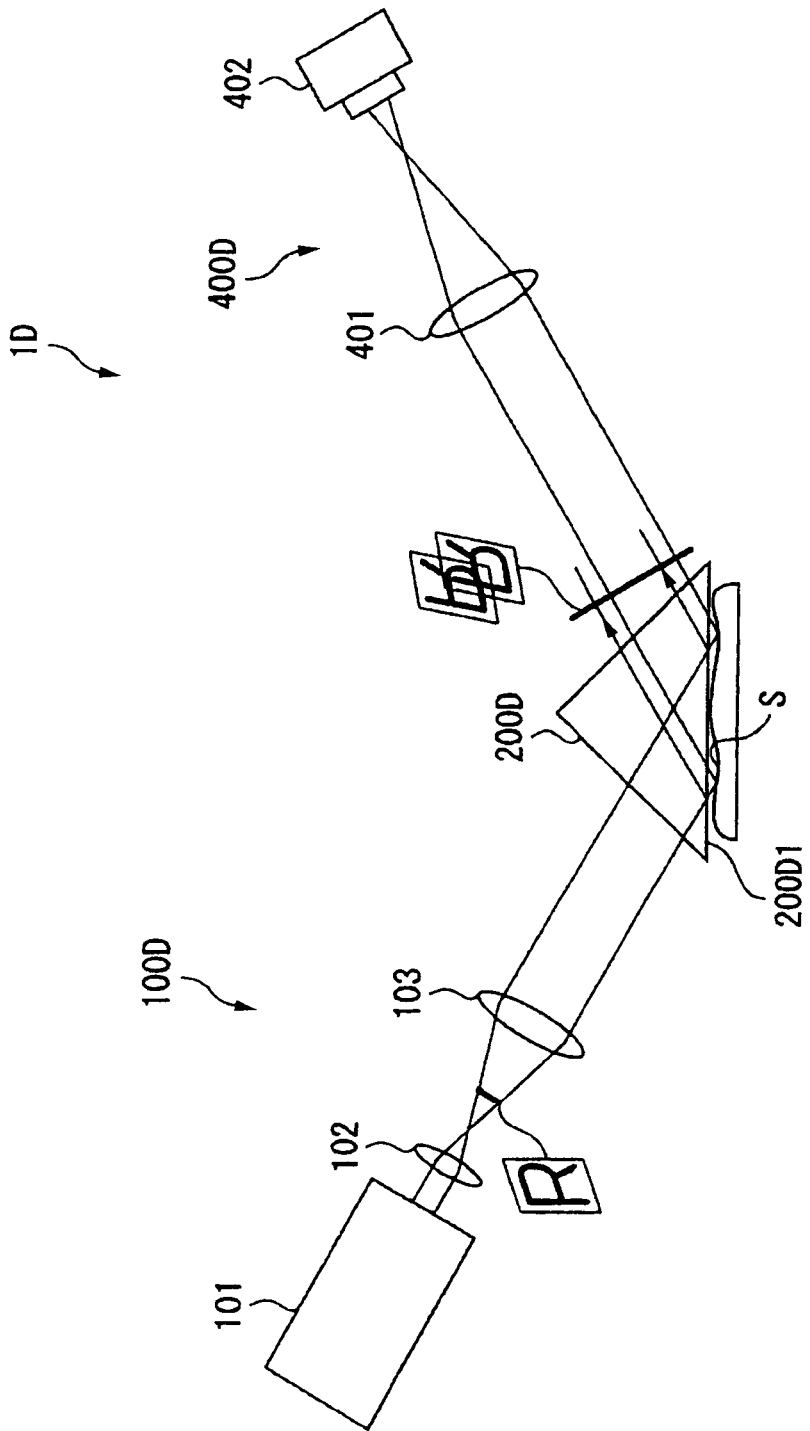
FIG. 6 is a diagram illustrating the configuration of a conventional grazing incidence interferometer of a common path type.

FIG. 5 is a diagram illustrating the configuration of a grazing incidence interferometer 1D in accordance with a reference example of the present invention. This reference example is characterized in that the image inverting part consists of one reflection mirror 500C. In addition, in this reference example, the optical path of the reference beam leading from the polarizing beam splitter 205 to the reflection mirror 500C and the optical of the measuring beam leading from the reflection mirror 206 to the measurement surface S are set parallel, and the optical path of the reference beam leading from the reflection mirror 500C to the polarizing beam splitter 302 and the optical of the measuring beam leading from the measurement surface S to the reflection mirror 301 are set parallel.

Also with such a reference example, as the reflection mirror 500C reflects the reference beam once, the orientation of the wave front of the reference beam can be inverted, and the orientations of the wave fronts of the reference beam and the measuring beam of the combined beam components can thereby be arranged properly, thus allowing the measurement accuracy to be maintained satisfactorily. In addition, since the image inverting art is constituted by one reflection mirror 500C, the configuration of the grazing incidence interferometer 1C can be simplified. Additionally, since the optical path of the reference beam is formed in a V-shape by the interposition of the reflection mirror 500C, the optical path length of the reference beam can be made large, so that the difference in the optical path length between the reference beam and the measuring beam can be set to less than the coherent distance.

What is claimed is:

1. A grazing incidence interferometer comprising:
a beam source section;
a beam splitting section configured to split a beam from the beam source section into a measuring beam emergent to a measurement surface and a reference beam serving as a measurement reference, and configured to cause the measuring beam to emerge obliquely to the measurement surface;
a beam combining part configured to combine the reference beam and the measuring beam reflected at the measurement surface, to obtain a combined beam;
a detecting section configured to detect a profile of the measurement surface based on an interference fringe formed by the combined beam; and
an image inverting part configured to invert an orientation of a wave front of the measuring beam or the reference beam, wherein:
the beam splitting section causes the reference beam to emerge with an attitude in which the reference beam directly reaches the beam combining section; and
the image inverting part is provided in an optical path of the measuring beam or the reference beam leading from the beam splitting section to the beam combining section, wherein:
the image inverting part includes a dove prism formed with a cross-sectionally trapezoidal shape having equal base angles; and
the dove prism refracts the beam incident on one end face thereof toward a bottom surface side thereof, and after reflecting the beam at the bottom surface toward another end face thereof, makes the beam from the other end face emergent along a direction identical to an incidence direction of the beam with respect to the one end face.

2. A grazing incidence interferometer comprising:
a beam source section;
a beam splitting section configured to split a beam from the beam source section into a measuring beam emergent to a measurement surface and a reference beam serving as a measurement reference, and configured to cause the measuring beam to emerge obliquely to the measurement surface;
a beam combining part configured to combine the reference beam and the measuring beam reflected at the measurement surface, to obtain a combined beam;
a detecting section configured to detect a profile of the measurement surface based on an interference fringe formed by the combined beam; and
an image inverting part configured to invert an orientation of a wave front of the measuring beam or the reference beam, wherein:
the beam splitting section causes the reference beam to emerge with an attitude in which the reference beam directly reaches the beam combining section; and
the image inverting part is provided in an optical path of the measuring beam or the reference beam leading from the beam splitting section to the beam combining section, wherein
the image inverting part includes a plurality of reflection mirrors, reflects an incident beam three times by the plurality of reflection mirrors, and after inverting its wave front, makes the beam emergent along a direction identical to an incident direction.

3. A grazing incidence interferometer comprising:
a beam source section;
a beam splitting section configured to split a beam from the beam source section into a measuring beam emergent to a measurement surface and a reference beam serving as a measurement reference, and configured to cause the measuring beam to emerge obliquely to the measurement surface;
a beam combining part configured to combine the reference beam and the measuring beam reflected at the measurement surface, to obtain a combined beam;
a detecting section configured to detect a profile of the measurement surface based on an interference fringe formed by the combined beam; and
an image inverting part configured to invert an orientation of a wave front of the measuring beam or the reference beam, wherein:
the beam splitting section causes the reference beam to emerge with an attitude in which the reference beam directly reaches the beam combining section; and
the image inverting part is provided in an optical path of the measuring beam or the reference beam leading from the beam splitting section to the beam combining section, wherein:

the beam splitting section includes a splitting member and a first bending member;

the splitting member splits the beam emergent from the beam source section into the measuring beam and the reference beam and causes the reference beam to emerge with an attitude in which the reference beam directly reaches the beam combining section;

the first bending member causes the measuring beam emergent from the splitting member and incident on the first bending member to emerge obliquely toward the measurement surface, to thereby bend the optical path of the measuring beam;

the beam combining section includes a second bending member and a combining member;

the second bending member causes the measuring beam reflected at the measurement surface and incident on the second bending member to emerge toward the combining member, to thereby bend the optical path of the measuring beam toward a side of the combining member; and the combining member combines the reference beam emergent from the splitting member and the measuring beam emergent from the second bending member to obtain a combined beam.

4. The grazing incidence interferometer according to claim 1, wherein
the image inverting part is provided in the optical path of the reference beam leading from the beam splitting section to the beam combining section.

5. The grazing incidence interferometer according to claim 1, wherein
the beam splitting section comprises a polarizing beam splitter.

6. The grazing incidence interferometer according to claim 1, wherein
the beam splitting section comprises a polarizing beam splitter and a reflection mirror.

7. The grazing incidence interferometer according to claim 1, wherein
the beam combining part comprises a polarizing beam splitter.

8. The grazing incidence interferometer according to claim 1, wherein
the beam combining part comprises a reflection mirror and a polarizing beam splitter.

9. The grazing incidence interferometer according to claim 2, wherein
the image inverting part is provided in the optical path of the reference beam leading from the beam splitting section to the beam combining section.

10. The grazing incidence interferometer according to claim 2, wherein
the beam splitting section comprises a polarizing beam splitter.

11. The grazing incidence interferometer according to claim 2, wherein
the beam splitting section comprises a polarizing beam splitter and a reflection mirror.

12. The grazing incidence interferometer according to claim 2, wherein
the beam combining part comprises a polarizing beam splitter.

13. The grazing incidence interferometer according to claim 2, wherein
the beam combining part comprises a reflection mirror and a polarizing beam splitter.

* * * * *